United States Patent [19]

Gunda

[11] Patent Number: 4,798,527
[45] Date of Patent: Jan. 17, 1989

[54] CONTROL SYSTEM FOR INJECTION MOLDING MACHINE

[75] Inventor: Rajamouli Gunda, Rochester Hills, Mich.

[73] Assignee: Vickers, Incorporated, Troy, Mich.

[21] Appl. No.: 164,957

[22] Filed: Mar. 7, 1988

[51] Int. Cl.$^4$ .................. B29C 45/77; B29C 45/82
[52] U.S. Cl. ........................ 425/145; 137/486; 137/487.5; 425/149; 425/542
[58] Field of Search .................. 137/486, 487.5; 425/145, 149, 563, 542, 586; 264/40.3, 40.7

[56] References Cited

U.S. PATENT DOCUMENTS

| | | | |
|---|---|---|---|
| 3,767,339 | 10/1973 | Hunkar | 425/149 |
| 3,779,680 | 12/1973 | Manceau | 425/145 |
| 3,904,078 | 9/1975 | Neff et al. | 425/145 |
| 3,920,367 | 11/1975 | Ma et al. | 425/149 |
| 3,941,534 | 3/1976 | Hunkar | 425/145 |
| 4,161,380 | 7/1979 | Bishop | 425/149 |
| 4,349,324 | 9/1982 | Neff et al. | 425/149 |
| 4,411,609 | 10/1983 | Yoshii et al. | 425/149 |

Primary Examiner—Willard Hoag
Attorney, Agent, or Firm—Barnes, Kisselle, Raisch, Choate, Whittemore & Hulbert

[57] ABSTRACT

An electrohydraulic servo system for controlling pressure of fluid in a cavity of undetermined volume includes a valve having a valve spool element and ports for supplying fluid as a function of position of the valve element within the surrounding valve body. A servo valve is responsive to electronic valve control signals for controlling pilot pressure within the main valve body and thereby controlling position of the valve element. An electronic valve controller receives a pressure command signal from remote master electronics as a function of desired fluid pressure within the cavity volume, and a pressure feedback signal indicative of fluid pressure within the cavity volume from a pressure sensor coupled to the valve output ports. The pressure command signal is compared to the pressure feedback signal in a pressure-control mode of operation, and a difference or error signal is employed for generating valve control signals to the servo valve. A second sensor is coupled to the valve element for supplying a position feedback signal as a function of position of the valve element within the surrounding valve body.

16 Claims, 2 Drawing Sheets

CONTROL SYSTEM FOR INJECTION MOLDING MACHINE

The present invention is directed to an electrohydraulic servo system for controlling supply of fluid under pressure to a cavity of unknown volume, and more particularly to a system of the described type for controlling both flow and pressure of hydraulic fluid fed to an injection molding machine.

BACKGROUND AND OBJECTS OF THE INVENTION

It is often desirable in electrohydraulic servo systems to control both system output flow and pressure in separate flow-control and pressure-control modes of operation. For example, in electrohydraulic control of an injection molding machine, it is desirable initially to operate the machine injection cylinder in a flow-control mode of operation for controlling flow of fluent plastic into the mold cavity, followed by a pressure-control mode of operation for maintaining desired pressure profile after the cavity is full. In electrohydraulic systems which employ electronic feedback of system pressure for closed-loop pressure control, problems arise because servo loop gains vary with cavity volume, and because effective cavity volume often varies either by operator intent or because of fluid leaks in the system. Total compression volume, including molten plastic in the mold cavity, may vary by a 12:1 ratio depending upon size and type of mold. However, a volume change as low as 10% to 20% requires adjustment of servo loop gains to maintain desired performance. In the past, loop gains have been adjusted manually (if at all) on an essentially empirical (trial and error) basis.

It is therefore a general object of the present invention to provide an electrohydraulic servo control system of the described character which includes facility for closedloop electronic control in a pressure control mode of operation in which loop gains are automatically adaptively adjusted during operation as a function of cavity volume. Another object of the invention is to provide an electrohydraulic servo system which includes facility for improved adaptive control of hydraulic fluid flow in separate flow-control and pressure-control modes of operation.

SUMMARY OF THE INVENTION

An electrohydraulic servo system for controlling pressure of fluid in a cavity of undetermined volume in accordance with the present invention includes a main valve having a valve spool element whose position is controlled by pilot fluid pressure, and ports for supplying fluid as a function of position of the valve element within the surrounding valve body. A servo valve is responsive to electronic valve control signals for controlling pilot pressure within the main valve body and thereby controlling position of the valve element. An electronic valve controller receives a pressure command signal from remote master electronics as a function of desired fluid pressure within the cavity volume, and a pressure feedback signal indicative of fluid pressure within the cavity volume from a pressure sensor coupled to the main valve output ports. The pressure command signal is compared to the pressure feedback signal in a pressure-control mode of operation, and a difference or error signal is employed for generating valve control signals to the servo valve.

In the preferred embodiment of the invention, a second sensor is coupled to the valve element for supplying a position feedback signal as a function of position of the valve element within the surrounding valve body. Both the position feedback signal and the pressure feedback signal are employed in the pressure control servo loop, with the pressure feedback signal being varied as a function of a gain $K_p$, the position feedback signal being varied as a function of a gain $K_d$, and the difference or error signal being varied as a function of a gain $K_e$. Cavity volume is determined as a function of the pressure and position feedback signals. Control loop gains, specifically gains $K_e$ and $K_d$, are varied as a function of cavity volume for thereby adapting the servo control system for either intended or unintended variations in cavity volume. Most preferably, the valve control electronics comprise a microprocessor-based controller which periodically samples the pressure and position feedback signals, updates loop gains as a function thereof, samples the pressure and flow command inputs, and automatically varies the valve control signal to the electrohydraulic servo valve, in either a flow-control or a pressure-control mode of operation, to obtain desired flow and pressure control at the mold cavity.

In the preferred implementation of the present invention for control of an injection molding machine, the valve control electronics includes facility for operating the valve initially in a flow-control mode as a function of flow command signals received from remote master electronics for controlling rate of injection of material into the molding machine, and subsequently in a pressure-control mode under control of pressure command signals received from the remote master electronics for maintaining desired pressure profile in the injection molding machine after the cavity has been filled. The servo control electronics includes facility for automatically switching from flow-control to pressure-control mode of operation when increasing cavity pressure, sensed by the pressure sensor at the main valve output, indicates that the injection mold cavity has been filled.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENT

Figure 1:
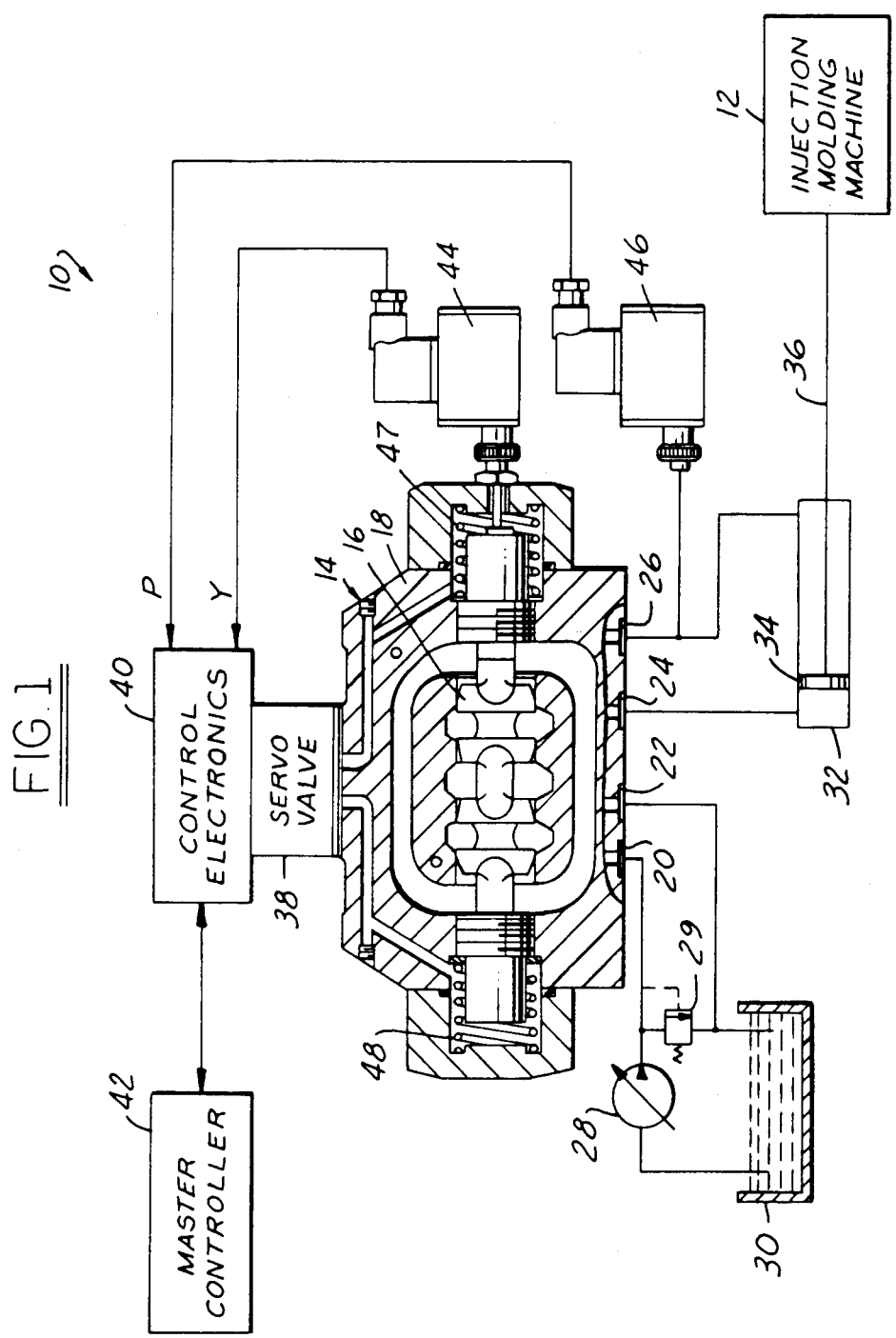
FIG. 1 is an electrohydraulic schematic diagram of a servo system in accordance with a presently preferred embodiment of the invention.

FIG. 1 illustrates an electrohydraulic servo system 10 in accordance with the present invention for operating the injection ram of a conventional injection molding machine 12. System 10 includes a main valve 14 in which a valve spool element 16 is movably mounted within a valve body 18 for controlling application of hydraulic fluid from the input ports 20,22 to the output ports 24,26. A pump 28 feeds hydraulic fluid from a source 30 to ports 20,22 at a fixed pressure set by a relief valve 29. An accumulator (not shown) may be employed to suppress transient pressure fluctuations. Output ports 24,26 are connected to a linear actuator 32 on opposite sides of the actuator piston 34. Piston 34 is coupled by the shaft 36 to the injection ram (not shown) of molding machine 12. It will thus be appreciated that main valve 14 is configured as a so-called P-Q valve for controlling flow Q and pressure P of hydraulic fluid to actuator 32, and thus to control velocity of the injector ram and pressure applied thereby within molding machine 12. For pressure control purposes, total volume under compression is the volume in the downstream side of valve 14—i.e., fluid volume within actuator 32 and cavity volume within machine 12.

An electrohydraulic servo valve 38 is mounted on valve block 18 and is responsive to electronic valve control signals from control electronics 40 for supplying pilot pressure to control position of valve element 16 within valve body 18. Control electronics 40 is mounted in assembly on servo valve 38. Control electronics 40 receives command signals from, and transmits suitable operating and status data to, a remote master controller 42. A transducer or sensor 44, such as an LVDT, is mounted on valve body 18 and is coupled to element 16 for providing a feedback signal Y to control electronics 40 indicative of position of element 16 within valve body 18. Element 16 is biased to a neutral centered position with body 18 by the coil springs 47,48. A second sensor 46 is coupled to output port 26 (or output port 24) and provides a feedback signal P to control electronics 40 as a function of valve output fluid pressure.

Most preferably, servo valve 38 and control electronics 40 take the form of a unitary assembly of the type disclosed in U.S. patent application Ser. No. 901,816, filed Aug. 29, 1986 and assigned to the assignee hereof. The disclosure of such application is incorporated herein by reference. Control electronics 40 in such preferred embodiment of the invention comprises a microprocessor-based controller which include facility for receiving, sampling and storing command signals from a master controller 42, and for generating appropriate valve control signals to servo valve 38. Control electronics 40 also includes memory having valve control programs and start-up data prestored therein. Such programs are remotely selectable by master controller 42. Start-up data, including loop gain constants, are variable either from master controller 42 or through internal adaptive control programs as will be discussed in detail hereinafter. An exemplary master controller 42 is disclosed in U.S. patent application Ser. No. 923,185, filed Oct. 27, 1986 and likewise assigned to the assignee hereof.

Figure 2:
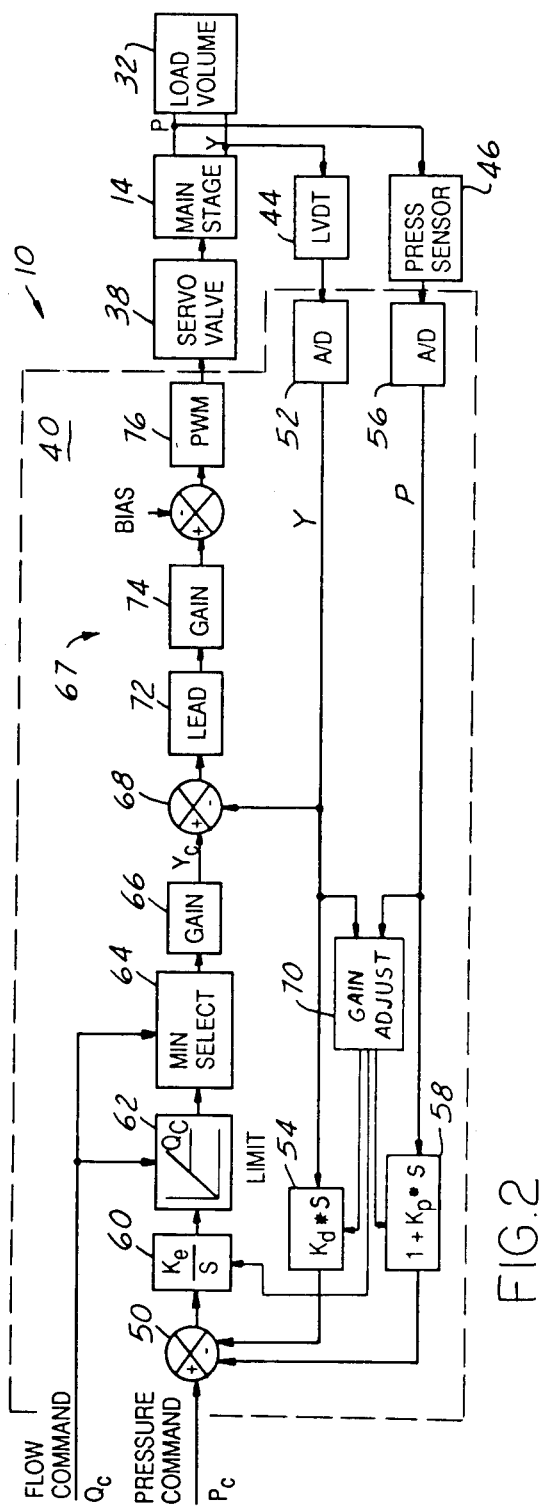
FIG. 2 is a functional block diagram of the system schematically illustrated in FIG. 1.

FIG. 2 is a functional block diagram of system 10 illustrated schematically in FIG. 1, including a detailed functional block diagram of microprocessor-based control electronics 40 in accordance with the present invention. As indicated above, electronics 40 is preferably implemented in a microprocessor-based controller of the character disclosed in reference application Ser. No. 901,816. Thus, it will be appreciated that the functional block diagram of control electronics 40 in FIG. 2 illustrates such microprocessor-based controller as configured by suitable control programming. It will also be appreciated that such microprocessor-based controller includes facility for sampling and storing each of the input signals thereto at periodic sampling intervals. Such sampling circuitry is not illustrated functionally in FIG. 2 for purposes of clarity.

Referring to FIG. 2, a pressure command Pc received from master controller 42 (FIG. 1) is fed to the non-inverting input of a summing junction 50 within control electronics 40. The output Y of position sensor 44 is fed through an a/d converter 52 and through a feedback compensation network 54 to an inverting input of junction 50. Likewise, the output P of pressure sensor 46 is fed through an a/d converter 56 and through the feedback compensation network 58 to an inverting input of junction 50. At feedback network 54, the position feedback signal Y is multiplied by the gain Kd and by the Laplace character "S", such multiplication being a standard technique for illustrating a differentiation operation. Likewise, in feedback network 58, output P of pressure sensor 46 is multiplied by the factor $(1+Kp*S)$, including the gain Kp. The output of junction 50, representing the difference between the pressure command input Pc and the position and pressure feedback signals Y,P varied by respective feedback networks 54,58, is fed to an integrator 60 where it is multiplied by the gain Ke and divided by the Laplace character "S". A gain adjustment network 70 has inputs which receive position feedback Y and pressure feedback P, and outputs coupled to feedback networks 54,58 and integrator 60 for selectively and adaptively varying gains Kp, Kd and/or Ke as will be described hereinafter.

The output of integrator 60 is fed through a limiting stage 62 to a minimum-selection stage 64. Stages 62,64 also receive as inputs a flow command signal Qc from master controller 42. Limiting stage 62 provides an output which is equal to its input from integrator 60 up to a limit corresponding to flow command Qc. The output of minimum-select stage 64, which follows the lesser of its inputs, is fed through a gain 66 as a position command signal Yc to a position control servo loop 67 at the non-inverting input of a summing junction 68. The inverting input of junction 68 receives position feedback Y from sensor 44. The differential output of junction 68 thus indicates position error at valve element 16 (FIG. 1). A lead network 72 compensates the position error for operational lag at valves 14,38 and for lag introduced by the digital sampling process. The compensated position error signal is fed through a gain 74, and suitable bias is added to the output. The result is fed through a pulse width modulation amplifier 76 to the torque motor of servo valve 38.

In operation, control electronics 40 receives a flow command Qc from master controller 42 indicative of desired rate of fluid flow at output ports 24,26 of valve 14, a corresponding velocity of piston 34 within actuator 32 and a directly corresponding rate of flow of molten plastic into the cavity of molding machine 12. Likewise, controller 40 receives a pressure command Pc indicative of desired pressure within the mold cavity. (It will be appreciated that flow of fluent material in the injection molding machine corresponds to hydraulic fluid flow at actuator 32 by means of direct coupling 36, neglecting leakage, and that fluid pressure within the mold cavity directly corresponds to hydraulic fluid pressure sensed at sensor 46.) Control electronics 40 is responsive to commands Qc, Pc and to feedback signals Y, P to select between pressure and flow control modes of operation and to feed a corresponding position command Yc to position servo loop 67.

More specifically, and assuming that actuator piston 34 (FIG. 1) and the injector ram of machine 12 are initially fully withdrawn, fluid pressure P is low (FIG.

Figure 3:
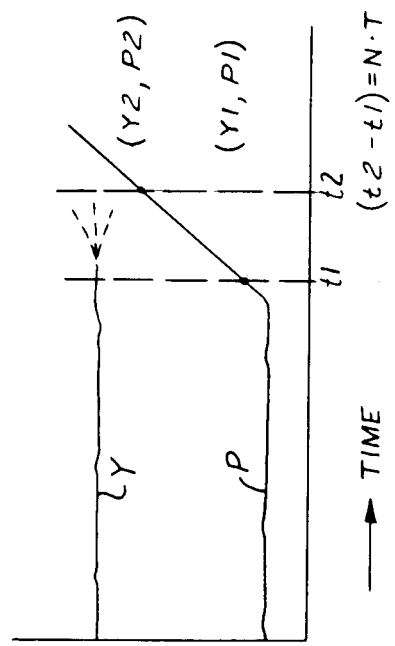
FIG. 3 is a graphic illustration useful in understanding operation of the preferred embodiment of the invention.

3), yielding a high output at integrator 60. Flow command Qc is therefore selected at stage 64 and fed after suitable gain 66 to junction 68 as position command Yc. Position control loop 67 thus controls servo valve 38 and valve 14 for obtaining constant position Y (FIG. 3) of element 16 (FIG. 1), corresponding to a constant desired flow rate Qc. When the mold cavity of machine 12 becomes filled with plastic, back pressure retards motion of piston 34 within actuator 32, and feedback pressure P begins increasing rapidly (FIG. 3). In feedback network 58, pressure P is differential (Kp*S) and added to itself. As this sum, which thus represents both magnitude and rate of change of pressre P, approaches pressure command Pc, the outputs of integrator 60 decreases. When such output is less than flow command Qc, minimum select 64 switches to a pressure-control mode and feeds the integrated pressure differential to loop 67 as position command Yc. Select stage 64 thus selects between flow-control and pressure-control modes of operation at valves 38,14 as a function of magnitude and rate of change of pressure feedback signal P from sensor 46. For pressure control purposes, system 10 (FIG. 1) is essentially defined by fluid supply pressure determined at regulator 29, effective volume under compression and system leakage. System leakage can be assumed to be constant. Effective volume under compression is defined as the equivalent volume that gives the compressibility effect of fluid in actuator 32 and of the molten plastic in mold 12. For a given system defined by the above parameters, there is a unique set of gains Ke, Kd and Kp needed to obtain desired system pressure control. Gains Ke, Kd and Kp are determined by gain adjustment network 70.

Starting at the end of the flow control phase—i.e., when injection actuator 32 is fully extended and the cavity of mold 12 is filled—pressure P rises (FIG. 3) according to the following equation:

$$V*(dP/dt) = B*Q(t) \tag{1}$$

where V is cavity volume and B is effective bulk modulus of the hydraulic fluid and molten plastic. Flow rate Q(t) can be expressed in terms of position Y of valve spool 16, and equation (1) can be rewritten as follows:

$$V*(dP/dt) = K*(Y - Yz)*SQRT(Ps - P) \tag{2}$$

where Yz is center or zero-flow position of spool 16, K is a constant, Ps is supply pressure, and SQRT indicates the square root function. Equation (2) assumes, as a first order approximation, that metering area of valve 14 is proportional to spool travel from center. Spool position Y is constant (FIG. 3) as pressure increases until controller 40 switches from flow-control to pressure-control mode of operation.

Integrating equation (2) yields:

$$K*(Y - Yz)*t = 2*V*(SQRT(Ps - P1) - SQRT(Ps - P)). \tag{3}$$

The term SQRT(Ps−P1) is a constant which may be obtained by evaluating the solution of equation (3) at time t1 in FIG. 3 where pressure P is equal to P1 and position Y is equal to Y1. After N sampling intervals—i.e., at time t2 wherein pressure P equals P2—equation (3) becomes:

$$V = K/2*(N*T*(Y - Yz))/(SQRT(Ps - P1) - SQRT(Ps - P2)) \tag{4}$$

where T is sampling interval length—i.e., $N*T = (t2 - t1)$. Actual cavity volume V is thus determined. Where spool position Y changes from Y1 to Y2 during the sampling interval (t2−t1), average position (Y1+Y2)/2 may be employed in equation (4).

Once volume V is so identified at stage 70 per equation (4), gains Kp, Kd and/or Ke are adaptively adjusted accordingly. It has been found that integrator gain Ke increases essentially linearly with volume V, spool position feedback gain Kd decreases inversely as volume V increases, and pressure feedback gain Kp changes little as volume V changes by a factor of 12:1. Thus, in the preferred embodiment of the invention, gains Ke, Kp and Kd are adjusted at stage 70 as follows:

$$Ke = Ke1*Vr$$

$$Kp = Kp1$$

$$Kd = Kd1/Vr$$

$$Vr = V/V1 \tag{5}$$

where Ke1, Kp1, Kd1 and V1 are initially set nominal or design values.

The invention claimed is:

1. An electrohydraulic servo system for controlling pressure of fluid in a cavity of undetermined volume, said system comprising:
   valve means including a valve element, means for supplying fluid to said cavity as a function of position of said valve element, and means responsive to electronic valve control signals for controlling position of said valve element, and
   electronic valve control means including means for providing a pressure command signal Pc as a function of desired pressure of fluid in said cavity, means coupled to said valve means for providing an electronic pressure feedback signal P as a function of fluid pressure in said cavity, means for varying said pressure feedback signal as a function of a gain Kp, means for providing said valve control signal as a function of a difference between said pressure command signal Pc and said varied pressure feedback signal multiplied by a gain Ke, means for determining volume V of said cavity, and means for varying said gain Ke as a function of volume of said cavity.

2. The system set forth in claim 1 wherein said valve control means further comprises means coupled to said valve means for providing an electronic position feedback signal Y as a function of position of said valve element, and wherein said volume-determining means comprises means responsive to said feedback signals P and Y for determining cavity volume.

3. The system set forth in claim 2 wherein said volume-determining means comprises means responsive to a change in said position feedback signal Y over a preselected time duration divided by the square root of a change in said pressure feedback signal P over the same said time duration.

4. The system set forth in claim 3 wherein said valve control means further comprises means for providing said valve control signal as a function of a difference between said command signal Pc and rate of change of said position feedback signal Y multiplied by a gain Kd, and wherein said gain-varying means comprises means for varying said gain Kd as a function of said volume V.

5. The system set forth in claim 4 wherein said valve control means comprises means for establishing nominal gains Ke1, Kp1 and Kd1, and a nominal cavity volume V1, and means for setting said gains Ke, Kp and Kd according to the equations:

$$Ke = Ke1*Vr$$

$$Kp = Kp1$$

$$Kd = Kd1/Vr$$

$$Vr = V/V1.$$

6. The system set forth in claim 5 wherein said valve control means further comprises means for providing a flow command signal Qc, means for providing a first said valve control signal as said function of said pressure command Pc, said feedback signals P and Y and said gains Ke, Kd and Kp in a pressure-control mode of operation, means for providing a second said valve control signal as a function of said flow command signal Qc in a flow-control mode of operation, and means for selecting between said pressure-control and said flow-control modes of operation.

7. The system set forth in claim 6 wherein said mode-selecting means comprises means for selecting the lesser Yc of said first and second valve control signals.

8. The system set forth in claim 7 wherein said valve control means further comprises means responsive to a difference between said lesser signal Yc and said position feedback signal Y.

9. An injection molding machine including an electrohydraulic servo system for controlling injection of molten plastic into a cavity of the injection molding machine, said system comprising:
means for injecting said molten plastic into said cavity at a flow rate and a pressure which vary as a direct function of flow rate and pressure of hydraulic fluid fed to said injecting means,
valve means including a valve element, first ports for coupling to a source of hydraulic fluid under pressure, second ports coupled to said injecting means for supplying hydraulic fluid to said injecting means as a function of position of said valve element, and means responsive to electronic valve control signals for controlling position of said valve element,
means for supplying pressure and flow command signals as a function of desired pressure and flow of hydraulic fluid to said injecting means, and
control means responsive to said pressure and flow command signals for supplying said electronic valve control signal to said valve means; said control means comprising:
means for supplying an electronic position feedback signal as a function of position of said valve element,
means for supplying an electronic pressure feedback signal as a function of pressure of hydraulic fluid at said second ports,
means for supplying said valve control signal in a flow-control mode of operation as a function of a difference between said flow command signal and said position feedback signal,
means for supplying said valve control signal in a pressure-control mode of operation as a function of a difference between said pressure command signal and said pressure feedback signal, and
means for selecting between said flow-control and said pressure control modes of operation.

10. The system set forth in claim 9 wherein said selecting means comprises means responsive to increasing fluid pressure at said second ports, indicating that said cavity is full, for switching said control means from said flow-control to said pressure-control mode of operation.

11. The system set forth in claim 9 wherein said means for supplying said valve control signal in said pressure-control mode of operation further comprises means responsive to a difference between said pressure command signal and rate of change of said pressure feedback signal.

12. The system set forth in claim 11 wherein said means for supplying said valve control signal in said pressure-control mode of operation further comprises means responsive to a difference between said pressure command signal and rate of change of said position feedback signal.

13. The system set forth in claim 12 wherein said means for supplying said valve control signal in said pressure control mode of operation comprises means forming an electronic servo control loop, including means for multiplying at least some of said command, position feedback, pressure feedback, rate of change and electronic control signals by gains, and means for varying at least some of said gains as a function of volume of said cavity.

14. The system set forth in claim 13 wherein said control means comprises means responsive to said position and pressure feedback signals for determining volume V of said cavity, and means for varying said gains as predetermined functions of said volume.

15. The system set forth in claim 14 wherein said means for supplying said valve control signal in said pressure-control mode of operation comprises means for supplying said valve control signal as a function of the expression Ke(Pc-Kd*Ẏ-Kp*Ṗ-P), where Ke, Kd and Kp are said gains, Pc is said pressure command signal, Ẏ is said rate of change of said position feedback signal, P is said pressure feedback signal, and Ṗ is said rate of change of said pressure feedback signal.

16. The system set forth in claim 14 wherein said gain-varying means comprises means for varying said gains Ke, Kd and Kp as functions of the equations:

$$Ke = Ke1*Vr$$

$$Kp = Kp1$$

$$Kd = Kd1/Vr$$

$$Vr = V/V1$$

where Ke1, Kp1 and Kd1 are preselected nominal values of gains Ke, Kp and Kd respectively, and V1 is a preselected nominal value of said volume V.

* * * * *